N & M Liddell.
Corn-Planter.

№ 75435   Patented Mar. 10, 1868.

Witness
J. B. Gaylord
B. J. C. Hoar

Inventors
Noyes Liddell
Morris Liddell

United States Patent Office.

NOYES LIDDELL AND MORRIS LIDDELL, OF LAFAYETTE, NEW YORK.

Letters Patent No. 75,435, dated March 10, 1868.

IMPROVEMENT IN CORN-PLANTERS.

*The Schedule referred to in these Letters Patent and making part of the same.*

TO ALL WHOM IT MAY CONCERN:

Be it known that we, NOYES LIDDELL and MORRIS LIDDELL, of Lafayette, in the county of Onondaga, and State of New York, have invented a new and improved "Machine for Planting Corn;" and we do hereby declare that the following is a full and exact description thereof, reference being had to the accompanying drawings, making a part of this specification, in which—

Each letter refers to like parts in both of the figures.

Figure 1:
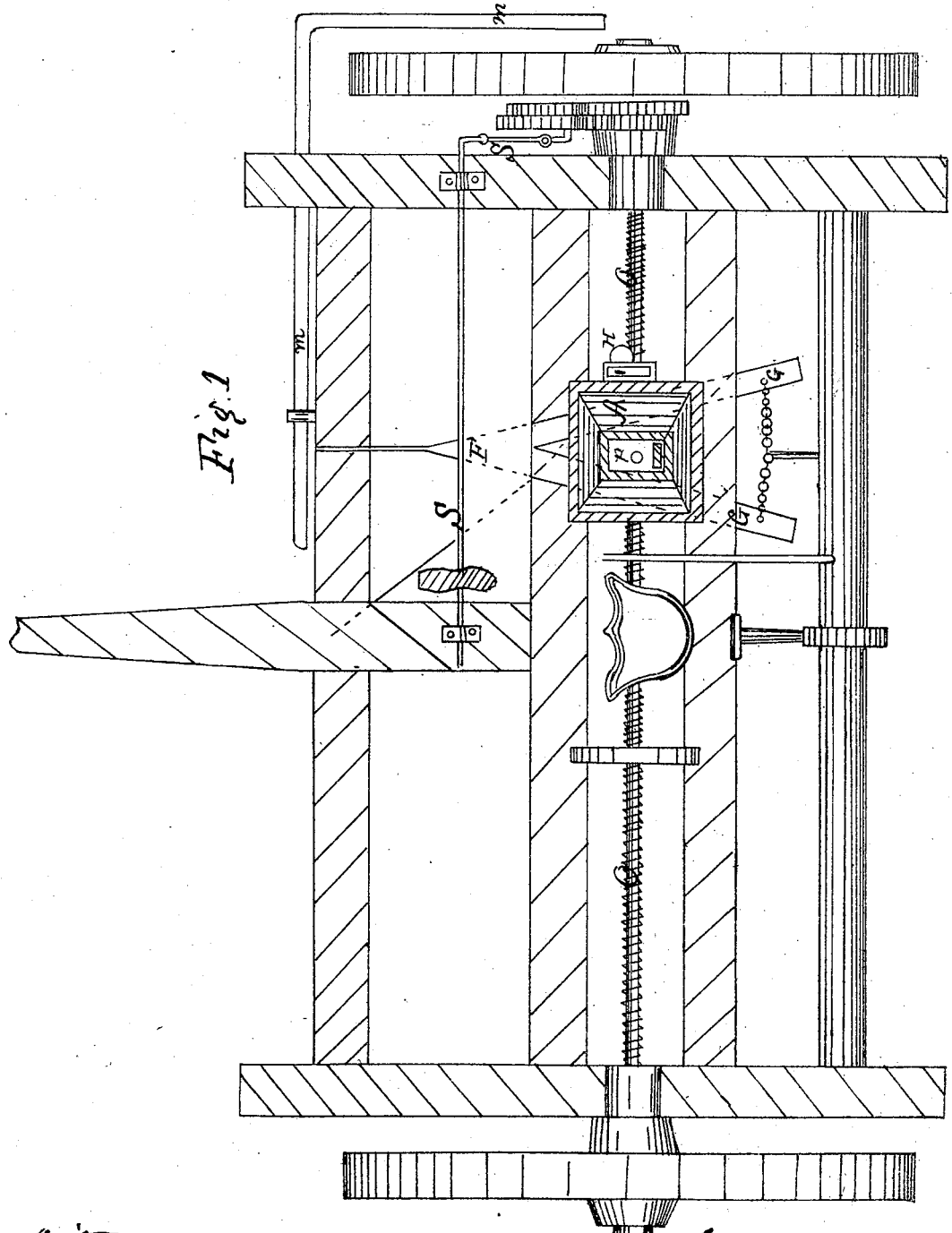
Figure 1 is a plan.
Figure 2:
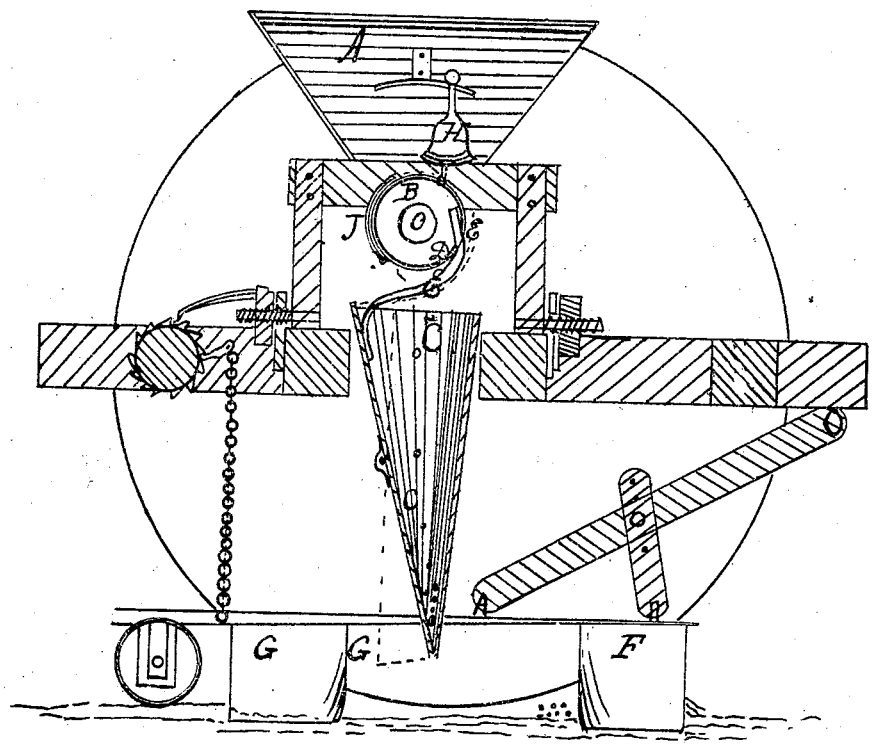
Figure 2 is a transverse section of the working parts of the machine.

To enable others skilled in the art to manufacture and use our invention, we will proceed to describe its construction and operation.

We construct the machines to be drawn with horse-power, and of suitable capacity to plant two or more rows of corn at a time, as may be desired. The different parts are so arranged that the driver can ride on the machine, and control all of its operations without assistance.

In the accompanying drawings, A is the hopper; B is the feed-wheel or dropper, having an adjustable cup in one side for measuring out the required quantity of seed for each hill.

On account of the slow motion of the cup in emptying, and the constant forward motion of the machine, the corn will not drop evenly in the hills, but will scatter along between them. To obviate this difficulty, the tub C is placed under the feed-wheel, in such a manner as to receive the corn as it falls from the feed-wheel, and deposit it snugly in the hill the instant the pin D presses upon the lever E.

F is a small plough or scraper for clearing away obstructions and making a small furrow in which to plant the corn. G G are scrapers for the purpose of covering the corn after it is planted. H is a bell, that is placed where it will be struck by the pin D at the time the corn is dropped. J is a slide for closing the opening at the bottom of the hopper when it is necessary to remove it for the purpose of adjusting the size of the cup. O is a shaft that drives the feed-wheels. It has a screw cut the whole length of it, so that by putting a nut on each side of each feed-wheel, they can be easily and accurately adjusted to plant the rows at any required distance apart. This rod has a groove cut in one side of it, for the purpose of fastening the feed-wheels with a key to prevent their slipping on the shaft.

By means of the band-wheel on the shaft O, the feed-wheels can be adjusted at the beginning of the row, or at any time when the regular dropping of the machine has been deranged by the driving-wheel passing over an obstruction, or from any other cause.

S is a rod, by means of which the driving-shaft can be thrown in or out of gear when it is necessary to adjust the feed-wheels. It is so arranged that the driver can operate it with his foot, at pleasure. M is a rod, used to assist the driver in guiding the machine at a proper distance from the previous row of corn planted.

In using the machine, the ground is first prepared in the ordinary manner for planting, and is marked for the rows of corn one way across the field. The machine is drawn across these rows at right angles to them. By the sounding of the bell H, the driver can ascertain whether the corn is dropped at the point where the track of the machine intersects the rows that have been marked, and can adjust the dropping accordingly.

I claim—

1. The combination and arrangement of the tube C, lever E, pin D, and bell H, for the purpose described.
2. The slide J, as described.
3. The method described of adjusting the feed-wheels on the shaft O.
4. The method described of throwing the shaft O in and out of gear.

NOYES LIDDELL,
MORRIS LIDDELL.

Witnesses:
J. B. GAYLORD,
B. J. C. HOWE.